No. 750,685. PATENTED JAN. 26, 1904.
E. PACKER.
SHAFT FOR VEHICLES.
APPLICATION FILED JUNE 23, 1903.
NO MODEL.
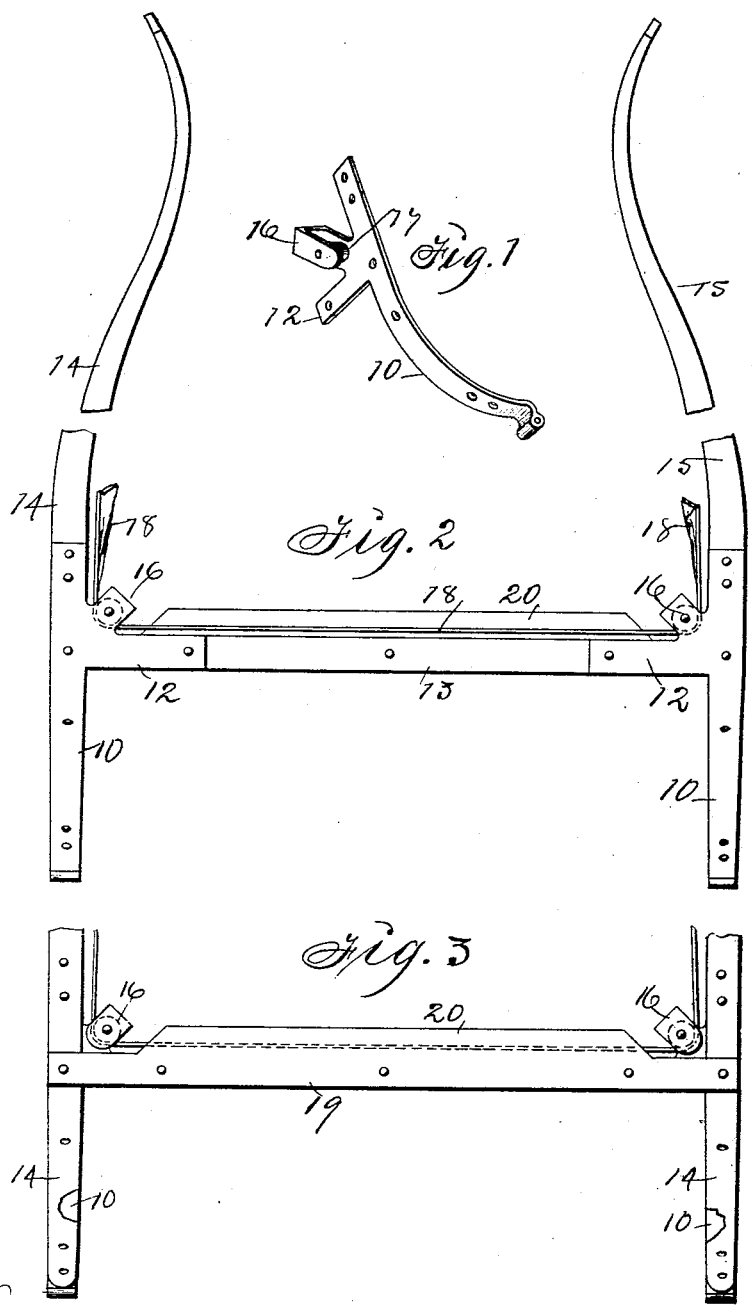

No. 750,685. Patented January 26, 1904.

UNITED STATES PATENT OFFICE.

ELI PACKER, OF DES MOINES, IOWA.

SHAFT FOR VEHICLES.

SPECIFICATION forming part of Letters Patent No. 750,685, dated January 26, 1904.

Application filed June 23, 1903. Serial No. 162,765. (No model.)

*To all whom it may concern:*

Be it known that I, ELI PACKER, a citizen of the United States, residing at Des Moines, in the county of Polk and State of Iowa, have invented a new and useful Shaft for Vehicles, of which the following is a specification.

My object is to provide improved shafts for vehicles for detachably connecting a single leather trace therewith and the harness on a horse, as required, to advantageously hitch and unhitch a horse to a vehicle, and to dispense with a swingletree.

My invention consists in the construction and combination of thill-irons and pulley-bearers with shafts, as hereinafter set forth, pointed out in my claims, and illustrated in the accompanying drawings, in which—

Figure 1 is a perspective view of one of my thill-irons adapted to serve as a brace and a pulley-bearer. Fig. 2 is a bottom view of a shaft for vehicles that shows the thill-irons applied as required for practical use. Fig. 3 is a top view of the rear end portion of a shaft and shows how a single strap or trace may be placed on the pulleys and its end portions extended forward to be detachably connected with short traces or some portions of a harness on a horse.

The numeral 10 designates a thill-iron adapted to be coupled or hinged to the front axle of a vehicle in a common way. It has an integral right-angled extension 12, adapted to overlie the cross-piece 13, that connects the thills 14 and 15 of the shaft. It also has an integral extension that projects forward at an angle of about forty-five degrees and is bent backward to produce a pulley-bearer 16, in which is mounted a pulley 17 in such a manner that a leather trace, strap, or rope 18 can be slipped on and off the pulley. Each side of the shaft is reinforced by applying one of these thill-irons and pulley-bearers, as shown in Fig. 2, and the shaft thereby adapted for placing a single strap or rope 18 on the pul-ley, as shown, to be connected with the harness on a horse, so that the draft force of the horse will be applied to the shaft without the use of a swingletree and serve the same purpose in hitching a horse to a vehicle.

A metal plate 19 is fixed on the top of the cross-piece 13, as shown in Fig. 3, and has forward a projection or shield 20, that covers the strap or rope 18 thus protected and retained on the pulleys.

By extending the pulley-bearers 16 forward at an angle provision is made for retaining the pulleys in the plane of the cross-piece 13 and in front of it, so that the strap 18 will be in front of the cross-piece and covered and protected by the shield 20.

Having thus described the purpose of my invention and the construction of each part as arranged and combined, the practical operation and utility of my improved shaft will be obvious to persons familiar with the art to which it pertains, and—

What I claim as new, and desire to secure by Letters Patent, is—

1. A thill-iron for vehicle-shafts consisting of a metal strap adapted to be hinged to the axle of a vehicle and having an integral right-angled projection and an integral pulley-bearer projecting forward at an angle as shown and described for the purposes stated.

2. A shaft for vehicles consisting of two thills rigidly connected at their rear end portions by a cross-piece and reinforced by thill-irons having integral right-angled extensions and integral pulley-bearers and pulleys mounted in said bearers, and a shield fixed on the top of the cross-piece, arranged and combined as shown and described for the purposes stated.

ELI PACKER.

Witnesses:
R. H. ORWIG,
THOMAS G. ORWIG.